(12) United States Patent
Gerber et al.

(10) Patent No.: US 6,772,592 B2
(45) Date of Patent: Aug. 10, 2004

(54) FLOAT DEPENDENT WAVE ENERGY DEVICE

(75) Inventors: James Gerber, Princeton, NJ (US); George W. Taylor, Princeton, NJ (US); Thomas J. Meaney, Chadds Ford, PA (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

(21) Appl. No.: 10/357,675

(22) Filed: Feb. 4, 2003

(65) Prior Publication Data

US 2003/0226358 A1 Dec. 11, 2003

Related U.S. Application Data

(60) Provisional application No. 60/354,216, filed on Feb. 4, 2002.

(51) Int. Cl.[7] ............................. F03B 13/12; F03G 7/00; F04B 35/00
(52) U.S. Cl. ............................. 60/495; 60/497; 60/501; 290/53; 415/916; 417/331
(58) Field of Search .......................... 60/495–507, 398; 290/53; 415/916; 417/330–333

(56) References Cited

U.S. PATENT DOCUMENTS

| | | | | |
|---|---|---|---|---|
| 4,441,316 A | * | 4/1984 | Moody | 60/497 |
| 4,754,157 A | * | 6/1988 | Windle | 290/53 |
| 4,858,434 A | * | 8/1989 | Masuda | 60/398 |
| 5,152,674 A | * | 10/1992 | Marx | 417/331 |
| 5,461,862 A | * | 10/1995 | Ovadia | 60/502 |

* cited by examiner

Primary Examiner—Sheldon J. Richter
(74) Attorney, Agent, or Firm—Henry I. Schanzer

(57) ABSTRACT

Apparatus for converting energy contained in surface waves on a body of water to useful energy comprises a float from which is suspended a fully or effectively fully submerged inverted cup-shaped member having a closed top end and an open bottom end. Disposed within the top space is a compressible fluid separated by a flexible membrane from a column of water filling the bottom open end of the submerged member. Passing surface waves cause pressure variations at the bottom end of the member causing changes in the water column height and corresponding changes in the buoyancy of the member. The buoyancy changes induce vertical oscillations of the member relative to the float and known means are used for converting the relative movements of the float and submerged member to useful energy. Preferably, the float vertically oscillates in synchronization with the passing waves, and the vertical movements of the float increase the relative movements between the float and the submerged member.

14 Claims, 3 Drawing Sheets

FLOAT DEPENDENT WAVE ENERGY DEVICE

This application claims the benefit of the filing date of Provisional Application No. 60/354,216 filed Feb. 4, 2002, the subject matter of which application is incorporated herein by reference.

BACKGROUND OF THE INVENTION

This invention relates to means for extracting energy from waves on the surface of a body of water, and relates particularly to improvements over the device and method disclosed in U.S. Pat. No. 4,441,316 to Moody.

In the Moody patent, a cup-shaped chamber is disposed, open end down, on the surface of a body of water on which surface waves occur. The chamber floats on the surface with the lower, open end of the chamber submerged. The chamber is normally filled with a column of water to a level equal to that of the surrounding water. As surface waves pass the container, the variations in water pressure caused by the passing waves induce oscillations in the height of the water column in the container. In the embodiment disclosed in FIG. 8 of the patent, a piston is disposed within the upper portion of the container and floats on the surface of the water column therein. The piston, including a piston rod which extends upwardly through the closed upper end of the container, is fixedly attached to a hydraulic pump. Accordingly, as the height of the water column varies within the container in response to passing waves, the piston within the container is caused to vertically oscillate for driving the hydraulic pump for pressurizing a hydraulic fluid which is used for driving an electrical generator for generating electrical energy.

The patent does not discuss how the container itself, aside from the movements of the water column therein, reacts to the passing waves. A problem, not discussed in the patent, is that, to the extent that the floating container bobs up and down in concert with the passing waves, thus reducing the depth changing effects of the waves, pressure variations at the bottom of the container are reduced resulting in a corresponding reduction in the amplitude of oscillations of the water column within the container. This reduces the amount of energy generated by the system.

SUMMARY OF THE INVENTION

A cup-shaped member similar to that disclosed in the Moody patent (the subject matter of which is incorporated herein by reference) is disposed, open end down, in completely (or, as described hereinafter, "effectively" completely) submerged relation beneath and dependent from a float. A column of water extends into the submerged member which includes, between the upper surface of the water column and the member closed upper end, a compressible fluid, e.g., air. Preferably, the water column and the overlying fluid are separated by an impervious, movable barrier for preventing direct contact between the water and the overlying fluid while allowing changes in the height of the water column. The submerged member is rigidly connected, e.g., by a vertical rod extending upwardly from the upper end of the member, to an energy converter, e.g., a hydraulic pump-electrical generator arrangement as disclosed in the patent.

In use, the height of the water column within the submerged member oscillates in response to overpassing surface waves. In response to such oscillations, the buoyancy of the member is changed resulting in vertical oscillations of the member beneath the float. Such oscillating movements drive the energy converter.

In one embodiment, the float from which the submerged member is dependent is of sufficient size relative to the passing surface waves as to be relatively immovable in response to the waves. Accordingly, the amplitude of the movements of the submerged member relative to the float is determined essentially solely by the movements of the member.

In a second embodiment, the float is dimensioned for vertical movements which are essentially in phase with the passing waves. Such wave-induced movements of the float increase the amplitude of the relative movements between the float and the submerged member for increasing the energy conversion efficiency of the system. For example, with a cresting wave tending to lift the float, an upward force is applied by the float to, e.g., the casing of the hydraulic cylinder. Simultaneously, owing to the increased water pressure caused by the wave, a decreased buoyancy of the submerged member applies a downward force to, e.g., the piston of the hydraulic cylinder. Thus, movements of the float, in addition to movements of the submerged member, drive the hydraulic cylinder.

Because the phase relationship of the movements of the float and the submerged member are of particular importance in the above-described second embodiment, means are preferably employed for synchronizing the movements of the submerged member with that of the float. Known means, such as the phase controlling mechanisms disclosed in the Moody patent, can be used.

In still another embodiment, a portion of an "effectively completely" submerged member extends above the water surface for increasing the volume of the air chamber. This provides increased changes in buoyancy, for greater power output, with a relatively small increase in the mass of the system.

DESCRIPTION OF THE DRAWINGS

The drawings are schematic and not to scale.

DESCRIPTION OF PREFERRED EMBODIMENTS OF THE INVENTION

Figure 1:
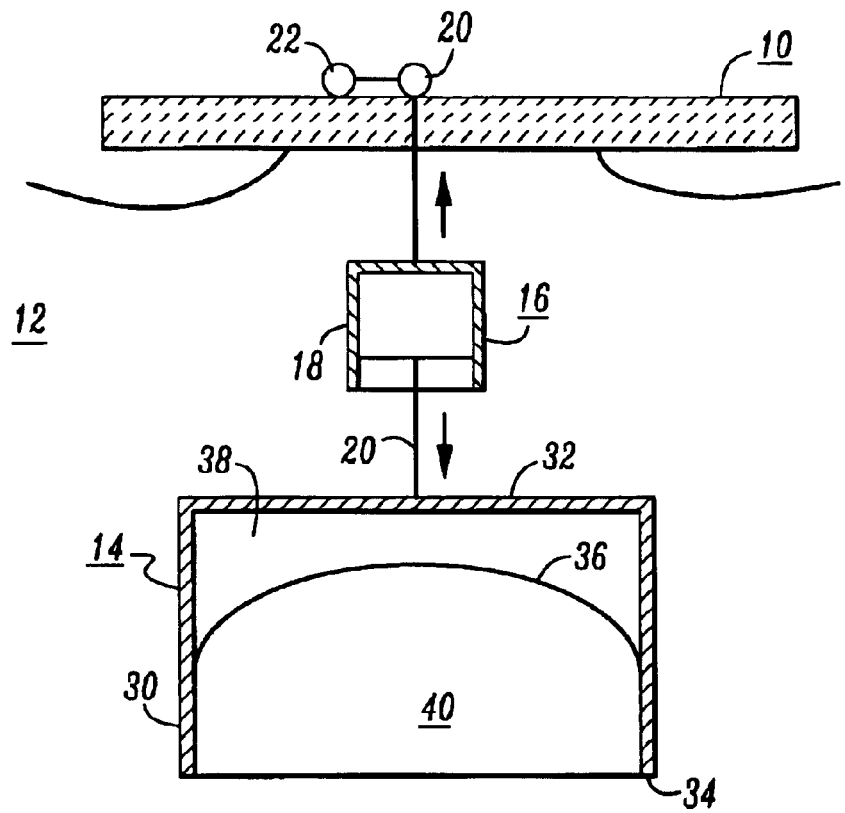
FIG. 1 shows a side sectional view of a system according to the present invention including a submerged member dependent from a float of such size as to be relatively vertically stationary in response to passing waves.

An energy extracting system, according to the present invention, is shown schematically in FIG. 1. The system includes a float 10 on the surface of a body 12 of water, preferably one experiencing large and constant surface waves. The system also includes a wave energy converter (WEC) 14 in accordance with one embodiment of the present invention and a known energy transducer for converting relative movements between the WEC 14 and the float 10 into useful energy. In the embodiment shown in FIG. 1, such energy converting means comprise a hydraulic cylinder 16 comprising a casing 18 and a piston 20 respectively rigidly connected to the float 10 and to the WEC 14. Relative movements between the float and the WEC cause a pumping of the hydraulic cylinder 16 for pressurizing a hydraulic fluid used for driving a hydraulic motor 20 driving, in turn, an electrical generator 22 for generating electrical energy. In the schematic illustration of FIG. 1, the hydraulic cylinder 16 is shown suspended in the water beneath the float 10. In actual use, the cylinder 16 is preferably disposed within the float 10 itself with, e.g., the casing 18 rigidly attached to the float 10 and the piston 20 extending downwardly to the WEC 14.

Figure 5:
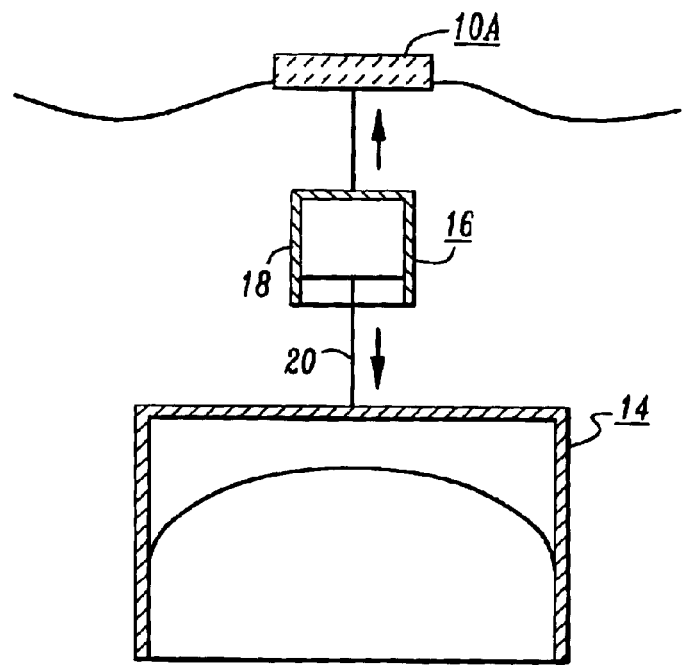
FIG. 5 is a view similar to FIG. 1 except using a float vertically movable in phase with the passing waves.

The purpose of the present invention is to capture energy present in surface waves by causing relative movements between a wave energy capturing mechanism and an energy transducer. Different known energy transducers can be used. A further example of a generally preferred energy converter is shown in FIG. 5. This embodiment of the invention is discussed hereinafter.

The WEC 14 shown in FIG. 1 comprises an inverted, cup-shaped shell 30 having a closed top end 32 and an open bottom end 34. In this embodiment, the WEC is completely submerged. A compressible fluid, preferably air, is trapped within the upper end 32 of the shell 30 by means of a flexible membrane 36, e.g., a sheet of rubber, plastic or other suitable material, peripherally attached to the inside wall of the shell 30 and completely separating the air chamber 38 from the column 40 of water filling the lower portion 34 of the shell 30.

Figure 2:
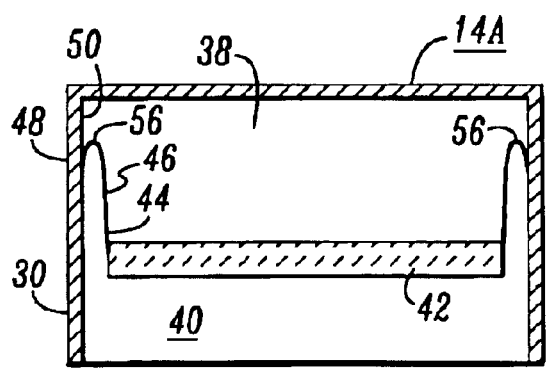
FIG. 2 shows a modification of the submerged member shown in FIG. 1.

A modification of the WEC 14 shown in FIG. 1 is shown in FIG. 2. In FIG. 2, a WEC 14A is shown which is otherwise identical to the WEC 14 except that the water column 40 is separated from the air chamber 38 by an impervious float 42 which floats on the surface of the water column 40. The entire periphery of the float is hermetically sealed to the lower, inside surface 44 of a cylindrical sleeve 46, the upper outside edge 48 of which is hermetically sealed to the inside surface 50 of the shell 30.

The cylindrical sleeve 46 is folded over at a movable ("rollable") fold 56, and vertical movements of the float 42 are readily accommodated by changes in the vertical position of the fold 56. The cylindrical sleeve 46 is of a flexible, elastometric material, and the sleeve is commercially available, being known as a flexible or rolling diaphragm. It is commercially available from the Marsh Bellofram Corp., Newell, W. Va. under the name "Bellofram Rolling Diaphragm".

In FIG. 1, the membrane 36, and in FIG. 2, the float 42-diaphragm 46 combination, are shown disposed interiorly of the WEC shell 30, thus subdividing the interior of the shell into two volumes 38 and 40. The positioning of the air-water separating members is not critical, and such members can be located where most convenient including at the bottom open end of the WEC shell. In such latter arrangement, a water column 40 exists within the WEC only at times of increased water pressure when the water-air chamber interface is forced inwardly of the shell 30.

The buoyancy of the WEC is determined by the weight of the water displaced by the WEC. The volume of water displaced by the WEC is essentially the volume of the air chamber 38. The air chamber volume is selected such that, with a perfectly flat, wave-free water surface and with a preselected depth of the WEC beneath the water surface, the WEC 14 is essentially neutrally buoyant and essentially weightless.

Clearly, by varying the volume of the air chamber, the amount of water displaced by the WEC is varied, thus varying the buoyancy and the weight of the WEC. With cresting waves, i.e., providing increased water depth of the WEC (as shown in FIG. 1), the water pressure at the bottom open end 34 of the WEC increases, thereby forcing water into the WEC for increasing the height of (or first forming) the water column therein and, by elastic displacement of the membrane 36, decreasing the volume of the air chamber 38. This decreases the buoyancy of the float which thus increases in weight and, in this embodiment, increases the downward force of the WEC on the hydraulic cylinder piston 20.

The compressed air within the air chamber 38 functions as a spring, and when the trough of the wave passes the float, the decreased water pressure at the bottom of the WEC allows the compressed air within the chamber to expand thereby increasing the volume of the chamber 38 and increasing the buoyancy of the WEC. An upward force is thus, in the present illustrative embodiment, applied against the hydraulic cylinder piston 20.

The WEC 14 thus vertically oscillates in response to the passing waves and cyclically pumps the hydraulic cylinder 16.

The change in buoyancy of the WEC (providing the forces for generating energy) is a function of the volume of the water pumped into and out of the WEC in response to water pressure changes. The volume of water moving into and out of the WEC is a function of the volume of the air chamber 38. In the embodiments shown in FIGS. 1 and 2, increasing the air chamber volume (for a given water column height) requires increasing the size of the WEC. To retain neutral buoyancy of the WEC, the shell 30 must be made correspondingly heavier. This is expensive while adding to the bulk (and handling difficulties) of the system.

Figure 3:
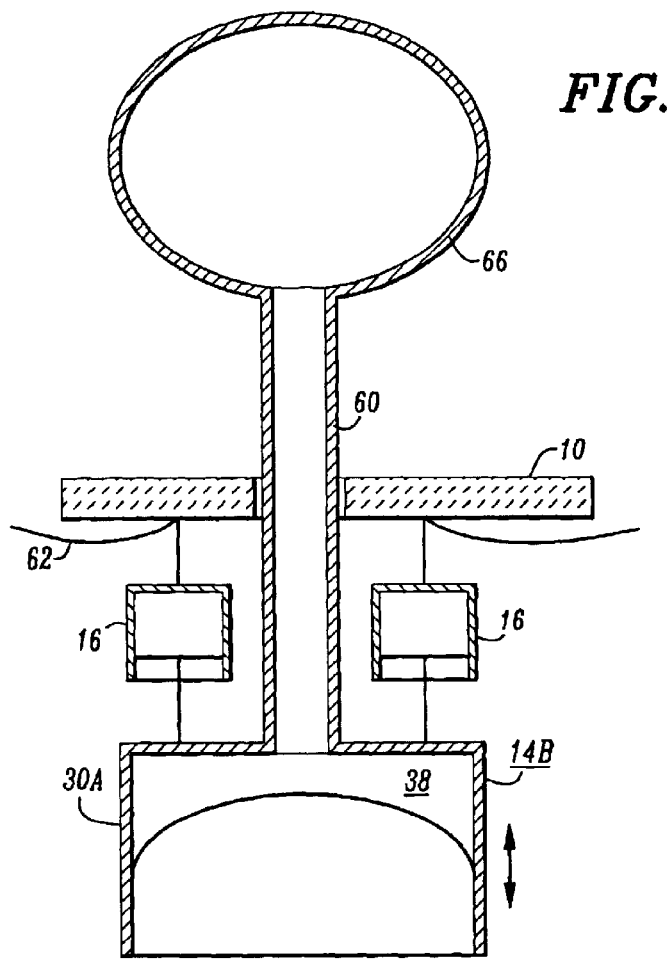
FIG. 3 is a view similar to FIG. 1 but showing an arrangement for increasing the air volume associated with the submerged member.

FIG. 3 shows a modification by means of which the compressible air volume is significantly increased, allowing a larger volume of water to be pumped into and out of the WEC, without a corresponding undesirable increase of system static buoyancy. In this embodiment, the WEC 14B comprises a cup-shaped shell 30A similar to that of the WECs shown in FIGS. 1 and 2, but including a vertically extending, hollow stem 60 which passes upwardly through the float 10 and above the surface 62 of the water. The volume of air within the stem 60 increases the volume of air within the WEC, but the part of the stem 60 projecting above the water surface does not contribute to the buoyancy of the WEC.

Operation of the WEC 14B is as previously described. With a cresting wave and increased water pressure at the bottom of the WEC, water is forced into the WEC until the pressure in the air chamber 38 equals that of the outside water pressure at the bottom open end of the WEC. The larger the initial, uncompressed volume of the air chamber 38, the greater the amount of water required to compress the air. The greater the volume of water entering the WEC, the greater is the reduction in buoyancy of the WEC and the greater the weight thereof for downwardly stroking the energy transducer.

The stem 60 is preferably of small diameter where it extends above the water surface. Desired added air volume is obtained by a bulb-like structure 66 at the stem upper end.

The reason for the small diameter portion of the stem 60 is to minimize the added buoyancy provided to the WEC as a cresting wave advances upwardly along the side of the stem 60. That is, while the rising wave tends to submerge an increasing length of the stem 60, owing to the relatively small diameter of the stem lower portion 60, little increase in submerged volume of the WEC occurs with corresponding little increase in the WEC buoyancy. Because of the minimal effects of the waves with respect to causing depth changes of the WEC 14B, the WEC is referred to as being "effectively" completely submerged. That is, the WEC 14B, similarly as the WECs 14 and 14A shown in FIGS. 1 and 2, tends to sink in response to cresting surface waves rather than rising with such cresting waves.

In operation, the described systems function as a damped spring having a natural resonant frequency. Maximum amplitude oscillations, desirable for maximum energy extraction efficiently, are obtained when the frequency of oscillation of the systems matches that of the passing waves. One approach is to design the systems with a natural frequency approximating the frequency of the surface waves. Only an approximate matching can be expected, particularly owing to the likely variations of the surface wave frequencies, and less than maximum energy efficiency will be obtained. Still, even with relatively poor frequency matching conditions, vertical oscillations of the WECs do occur and useful energy is produced. The wave energy is free and inefficient operation can be acceptable.

Figure 4:
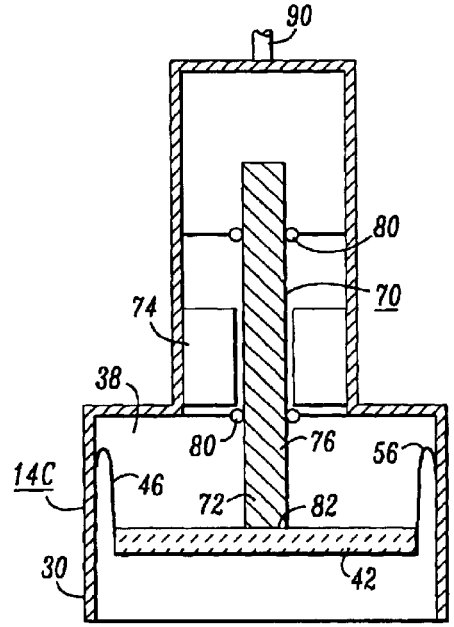
FIG. 4 is a view similar to FIG. 2 but showing a mechanism for synchronizing the movements of the submerged member with the passing waves.

Improved efficiency is generally desirable, however, and means can be included for synchronizing the movements of the WECs and the passing waves. An example of such synchronizing means is shown in FIG. 4.

In this embodiment, a WEC 14C is shown similar to the WEC shown in FIG. 2. That is, the WEC 14C includes a rigid float 42 hermetically sealed within the aforedescribed "rolling diaphragm" 46. Included within the WEC 14C is a linear electrical motor-generator mechanism 70 of known type, e.g., comprising a linear stator 72 and one or more cylindrical magnets 74 through which the stator passes. The stator 72 can be made from an elongated conductive rod around which is wound a continuous insulated coil 76. The stator is mounted between ball bearings 80 for free vertical movements through the magnet 74. The lower end 82 of the stator 72 is rigidly connected to the float 42 at the bottom of the shell 30.

As known, the motor-generator 70 functions as an electrical generator when the stator 72 is moved, by external forces, through the magnetic field provided by the magnet 74.

Conversely, the motor-generator 70 functions as a motor when an electrical voltage is applied across the coil 76 for causing current flow therethrough. In known manner, a mechanical force is applied against the stator for controlling the movement thereof.

The motor function is used for phase control purposes. Thus, when movement of the stator is detected as being out of phase with the changing ambient water pressure (e.g., continued stator movement owing to momentum at the instant when the direction of change in wave amplitude begins to change), the generator-motor 70 is operated as a motor for forcing the stator movements to match the ambient pressure changes.

Most simply, a relatively large current is driven through the stator in proper direction to achieve dynamic braking. The stator is thus essentially immediately braked to a halt after which the direction of stator movement is reversed for in-phase operation with the ambient water pressure.

Mechanisms for controlling the operation of linear motor-generators are known and readily adopted for use with the present invention. Water pressure sensitive means (not shown) such as the pressure transducer 32 and 33 shown by Moody (e.g., FIG. 2 and col.3 beginning at line 16) can be used to generate electrical signals for controlling the motor-generator 70 in response to detected water pressure changes.

Figure 6:
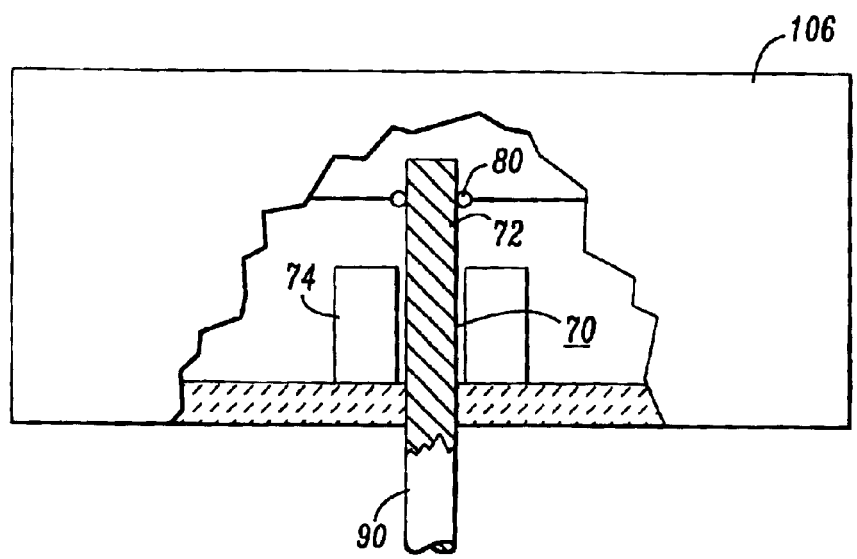
FIG. 6 is a side view, partially broken away, showing a linear generation energy transducer mounted within a surface float.

The WEC 14C is also suspended from a water surface float (not shown) by a rod 90 connected to an intermediate energy transducer, e.g., a hydraulic cylinder. Alternatively, the rod 90 can be connected (FIG. 6) to a stator 72 of a linear generator 70 similar to the one shown within the WEC 14C shown in FIG. 4 but mounted within a surface float 106. Vertical oscillations of the WEC 14C shown in FIG. 4 drive the linear generator in the float for generating electrical energy.

The surface float linear generator, because it is rigidly connected to the WEC 14C, can also be used in substitution for the linear generator within the WEC 14C for providing phase control of the WEC movements.

In the embodiment shown schematically in FIG. 1, a float 10 is used of such size as to be relatively immobile relative to the passing waves. The design characteristics of such immobile floats are known and, in general, provided the float has a length, in the direction of surface wave travel, at least equal to or greater than the wavelength of the passing waves, the float will be relatively vertically stationary relative to the passing waves. Some pitching of the float can occur but, dependent on the size of the float, the pitching can be of small amplitude relative to the wave amplitude.

An advantage of the use of a relatively large and vertically stable float 10 is the simplicity of design. Thus, because the float 10 is vertically stable, the sole cause of relative movements between the float and the WEC is the movements of the WEC. All WEC movements relative to the float are effective for generating energy, and this reduces the need for providing means for synchronizing the movements of the WEC with either the float or the overpassing waves.

In a preferred embodiment shown schematically in FIG. 5, the float 10a is of such small dimension relative to the surface wave wavelength [e.g., around one quarter wavelength] that the float tends to oscillate exactly in phase with the passing waves (the amplitude of such oscillation being a function of the total variable weight of the system.)

Significantly, however, and an important feature of the preferred embodiment, is that the forces applied by the vertically oscillating float 10a on the energy converter, e.g., the hydraulic cylinder casing 18, are 180 degrees out of phase with the forces being applied by the WEC 14 to the, e.g., cylinder piston 20. Thus, as the float moves upwardly (as shown in FIG. 5) in response to a wave of increasing height, thus applying an upward force, the increased water pressure at the bottom of the WEC caused by the cresting wave decreases the buoyancy of the WEC for causing a downward force. Such oppositely directed forces and attendant movements of the float and the WEC greatly add to the power output from the system.

In the embodiment shown in FIG. 5, synchronization of the movements of the float 10a and the WEC 14 is definitely desirable. The float movements are directly controlled by the passing waves, and the WEC movements are controlled by the aforedescribed (or similar) phase control mechanism illustrated in FIG. 4.

What is claimed is:

1. Apparatus for extracting energy from surface waves on a body of water comprising a float and a wave energy converter suspended from said float within said water;

said converter being hollow and including a closed top end and an open bottom end;

a compressible fluid disposed within said converter and being exposed to pressure variations in said body of water caused by overpassing surface waves for varying the volume of said fluid for varying the buoyancy of said converter; and means responsive to said buoyancy changes for generating forces for driving an energy transducer for generating useful energy.

2. Apparatus according to claim 1 including a flexible membrane separating said compressible fluid from said body of water.

3. Apparatus according to claim 1 including means for synchronizing movements of said converter with overpassing surface waves.

4. An apparatus according to claim 3 wherein said float is vertically movable in response to, and in-phase relation with, said surface waves.

5. Apparatus according to claim 1 including a movable, rigid barrier separating said fluid from said water, said barrier being movable within said converter in response to water pressure variations caused by passing waves.

6. Apparatus according to claim 5 including an energy transducer disposed within said float for converting movements of said converter to useful energy.

7. Apparatus according to claim 6 wherein said energy transducer comprises a linear electrical generator comprising a linear stator and a magnet, said stator being connected to said converter for causing movements of said stator relative to a magnetic field from said magnet for generating electrical energy.

8. Apparatus for extracting energy from surface waves on a body of water comprising a float and a wave energy converter suspended from said float within said water;

said converter being hollow and including a closed top end and an open bottom end;

a compressible fluid disposed within said converter and being exposed to pressure variations in said body of water caused by overpassing surface waves for varying the volume of said fluid for varying the buoyancy of said converter; and means disposed between said converter and said float for converting relative movements between said converter and said float into useful energy.

9. Apparatus according to claim 8 including a movable member hermetically separating said compressible fluid from said body of water.

10. Apparatus according to claim 8 wherein said converter is fully submerged within said water.

11. Apparatus according to claim 8 including means for synchronizing movements of said converter with overpassing surface waves.

12. An apparatus according to claim 11 wherein said float is vertically movable in response to, and in-phase relation with, said surface waves.

13. Apparatus according to claim 8 wherein said converter top end extends upwardly out of the water for providing above-water hollow space within the container not contributing to the buoyancy of the converter.

14. Apparatus according to claim 13 wherein said top end comprises a stem portion of small lateral dimensions for displacing only relatively small volumes of water in response to surface waves passing by and contacting said stem portion, and said stem portion being topped by an enlarged portion spaced out of contact with said waves.

* * * * *